Feb. 27, 1934.   R. C. MOORE   1,949,281
FEEDER
Filed Dec. 3, 1931   6 Sheets-Sheet 1

Inventor:
RICHARD C. MOORE
Knox Hudson & Kent
attys.

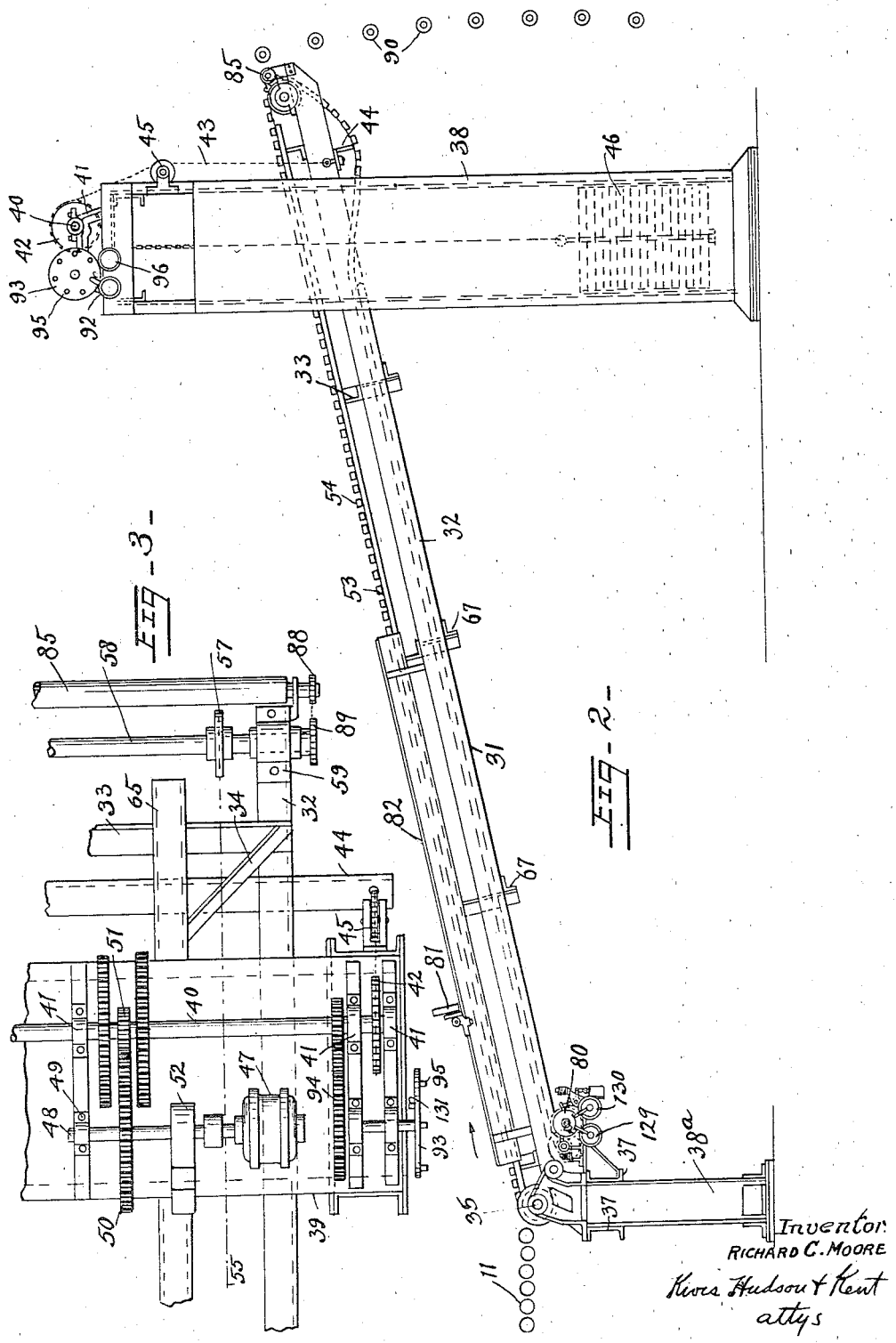

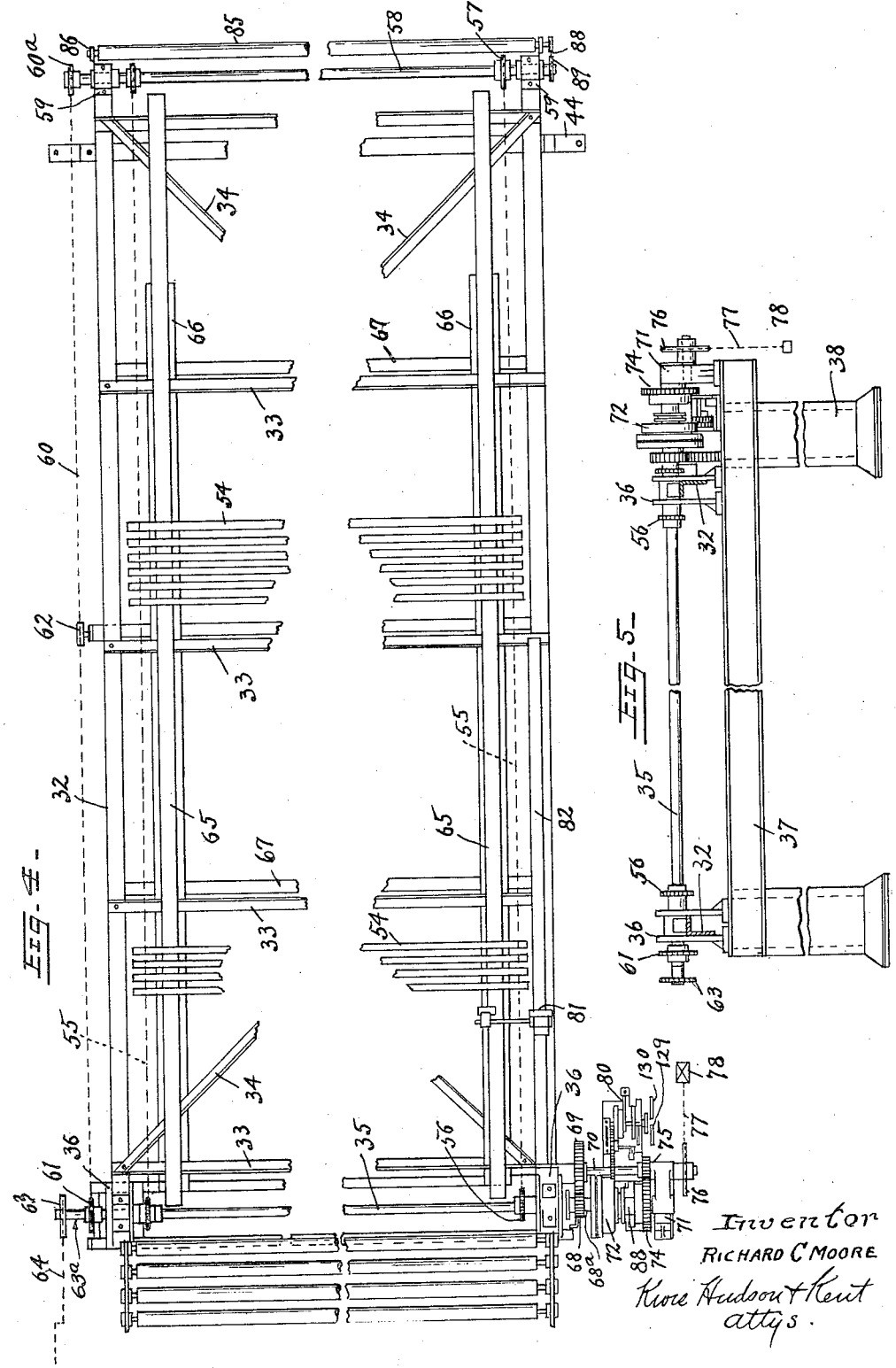

Feb. 27, 1934.   R. C. MOORE   1,949,281
FEEDER
Filed Dec. 3, 1931   6 Sheets-Sheet 4
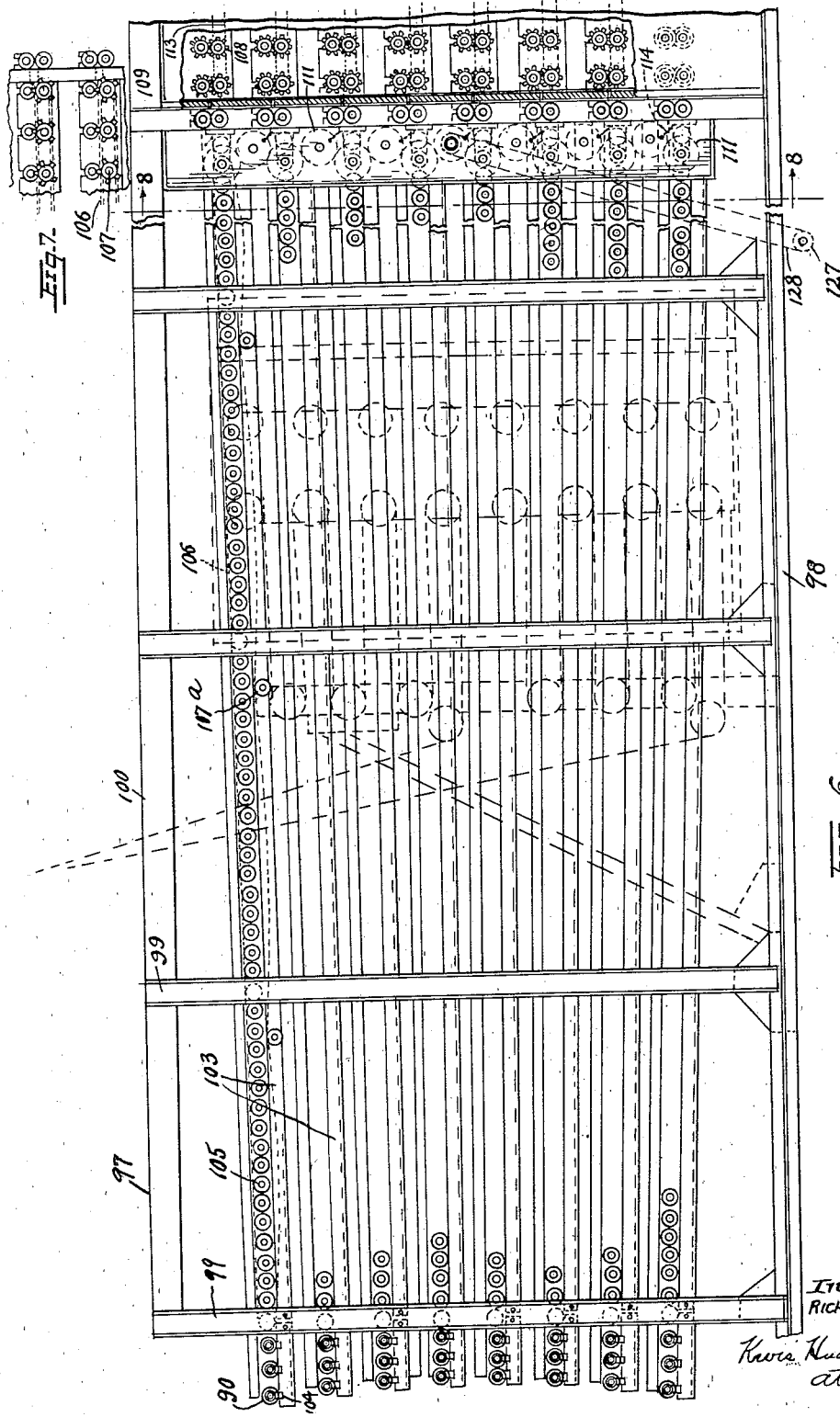
Inventor
RICHARD C. MOORE

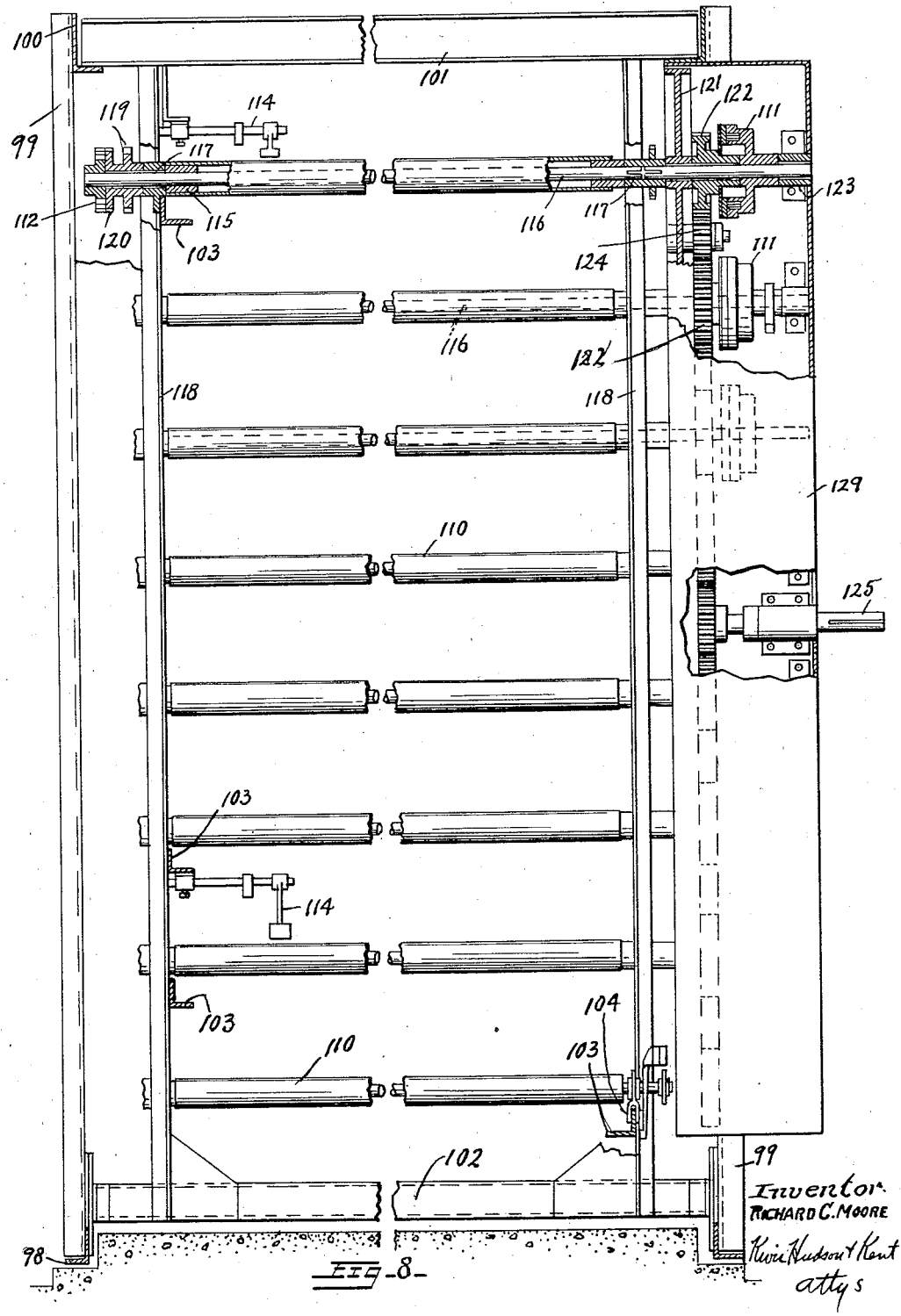

Feb. 27, 1934.   R. C. MOORE   1,949,281
FEEDER
Filed Dec. 3, 1931   6 Sheets-Sheet 6
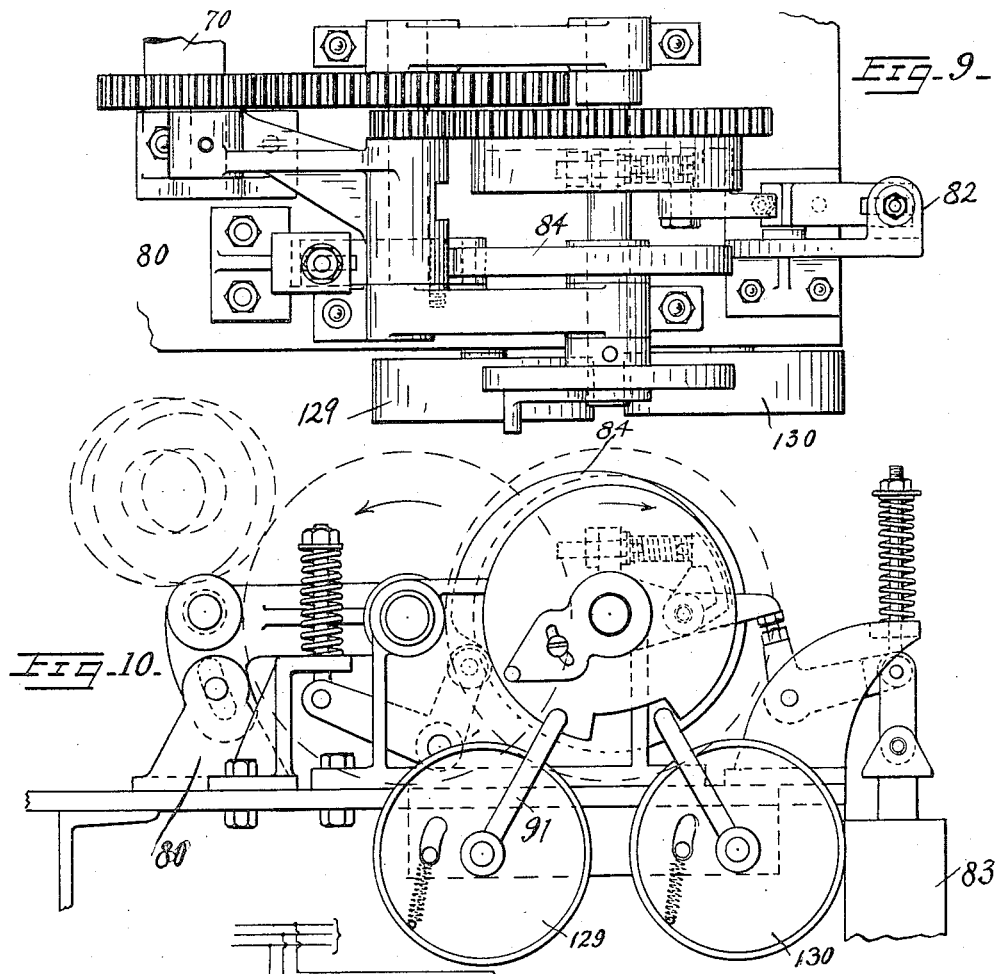
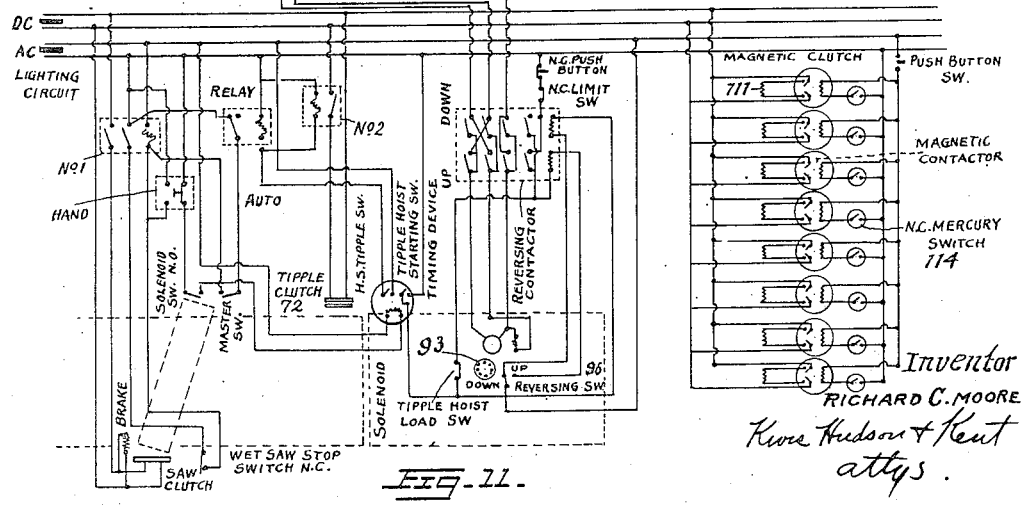

Patented Feb. 27, 1934

1,949,281

UNITED STATES PATENT OFFICE 1,949,281

FEEDER

Richard C. Moore, Painesville, Ohio, assignor to The Coe Manufacturing Company, Painesville, Ohio, a corporation of Ohio Application December 3, 1931. Serial No. 578,804

20 Claims. (Cl. 164—68)

This invention relates to a feeding or conveying apparatus for veneer, wall board, or like sheet material, which is cut from a log or extruded from a Fourdrinier machine in a continuous sheet, and which sheet material is in such a state as to require a drying operation before it can be used.

To more readily understand the invention it might be stated that the apparatus consists of a wet saw, which is adapted to sever the continuously formed sheet of material into any desired lengths without interrupting the continuity of the sheet, and a tipple onto which the cut sheet of material is fed and which is adapted to convey the cut sheet of material to the proper deck at the feed or entry end of a multiple deck drier.

The rate of speed at which the sheet material is either cut from the log or extruded from the machine is constant, as well as the speed of the conveying apparatus of the various decks within the drier proper. The wet saw for cutting the continuously fed sheet of material into the desired lengths is adapted to produce the necessary transverse cut or severance of the material without interruption thereto, while the conveyor of the tipple is adapted to operate at a high and low speed, so as to discharge the cut sheet of material on the proper deck at the feed end of the drier. The purpose of the high speed of the tipple conveyor is to insure a complete discharge of the cut sheet of material onto the feed end of the drier before the leading edge of the following sheet engages the tipple conveyor. The feed end of the drier is made up of decks in alignment with the decks of the drier, and each deck of the feed end includes a conveyor for transporting the sheet material from the tipple to the drier proper. These conveyors are adapted to operate likewise at a high and low speed, corresponding respectively with the high speed of the tipple conveyor and the constant low speed of the conveyor within the drier proper. These conveyors are further adapted to receive the cut sheets of material from the tipple conveyor at high speed, and suitable means are provided for automatically reducing the speed of the conveyors of the feed end to that of the speed of the conveyors of the adjacent deck of the drier.

The details of the wet saw and its operation are clearly illustrated and described in my copending application, Serial No. 504,867, filed December 26, 1930, and therefore only certain portions of this apparatus which are pertinent to the combination will be hereinafter further described.

It is therefore one of the objects of the present invention to provide a feeding or conveying apparatus which consists of a tipple adapted to receive a cut length of sheet material at one speed and to convey said material at an increased speed onto the feed end of a multiple deck drier.

A further object of the invention is to effect the high speed of the tipple conveyor by the operation of the wet saw for severing the sheet of material.

A further object of the invention is to automatically position the discharge end of the tipple adjacent the proper deck of the feed end of the drier for discharging the sheet material thereon.

A further object of the invention in connection with the feed end of the drier is to automatically reduce the speed of the conveyors constituting each deck by the material being conveyed therealong to the speed of the conveyor of the adjacent deck.

With the objects above indicated and other objects hereinafter explained in view, the invention consists in the construction and combination of elements hereinafter described and claimed.

Referring to the drawings:

Fig. 2 is a side elevational view of a tipple as part of the apparatus embodying the present invention;

Fig. 3 is a top plan view of the elevating and lowering mechanism for the tipple;

Fig. 4 is a top plan view of the tipple shown in Fig. 2;

Fig. 5 is an end elevational view of the feed end of the tipple shown in Fig. 2;

Fig. 6 is a side elevational view of the feed end portion of the multiple deck drier;

Fig. 7 is a fragmentary side elevational view showing the drive means for the lower rollers of the drier conveyor.

Fig. 8 is a transverse sectional view in elevation taken on line 8—8 of Fig. 6, portions being broken away and shown in section to more clearly illustrate the construction;

Fig. 9 is a fragmentary top plan view on an enlarged scale of the speed control mechanism for the tipple conveyor and the mechanism for controlling the elevation and lowering of the tipple;

Fig. 10 is a side elevational view of that shown in Fig. 9;

Fig. 11 is a schematic wiring diagram of the electrical control system employed in connection with the apparatus.

Figure 1:
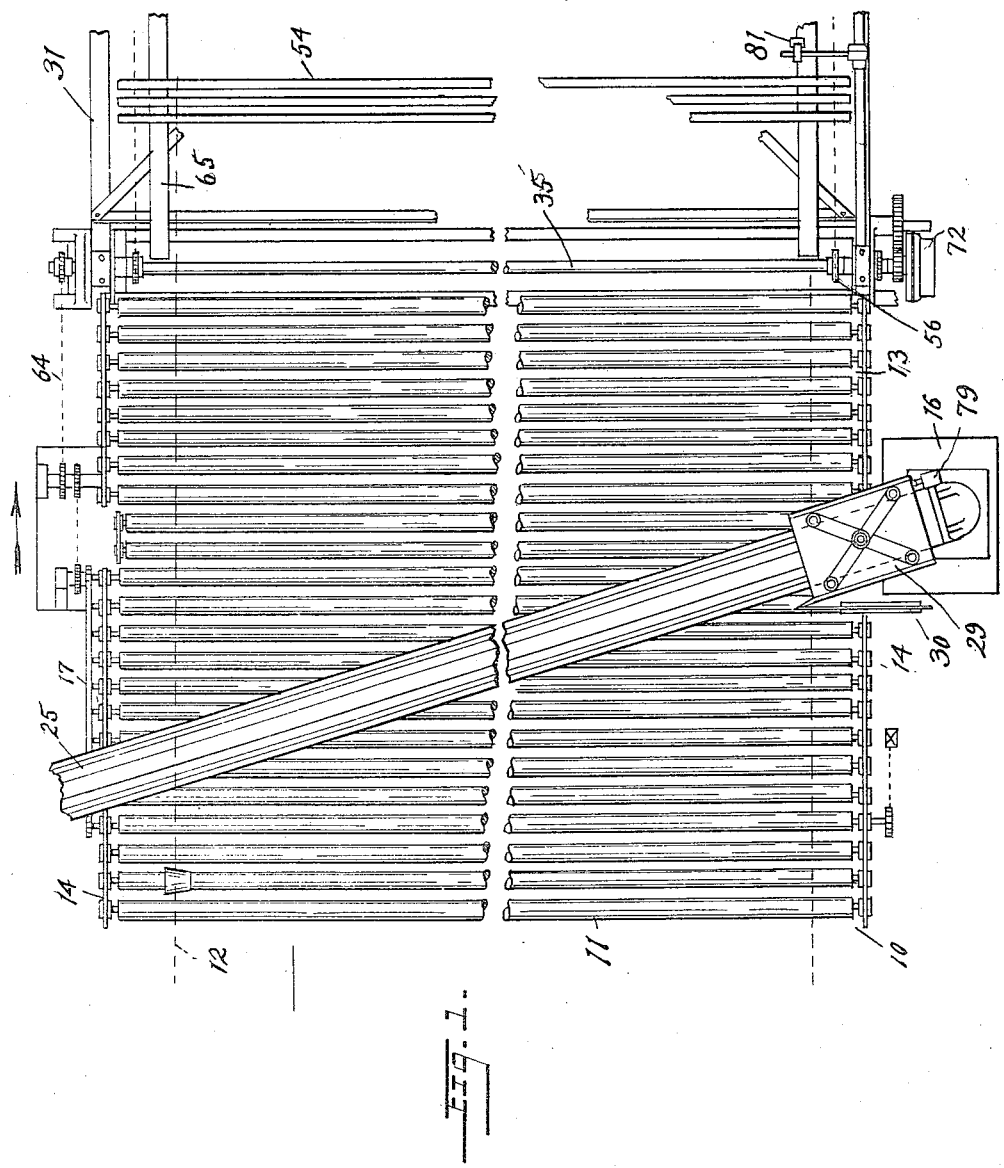
Figure 1 is a fragmentary top plan view of a wet saw used for severing the continually forming sheet of material into the desired lengths.

While Fig. 1 of the drawings illustrates a wet saw fully described in applicant's co-pending application heretofore referred to, reference to which may be had if necessary, it is thought desirable to at least partially describe its operation and its relationship to the present invention to be hereinafter described in detail.

In the drawings, and referring particularly to Fig. 1, 10 represents a wet saw table which comprises a plurality of rollers 11 extending longitudinally in spaced relation and in substantially a horizontal plane upon which the wall board or like material, indicated by dotted lines at 12, is adapted to continuously travel in the direction indicated by the arrows. These rollers 11 may be of any desired length depending upon the width of the material to be conveyed thereon and of any suitable material, but preferably metal tubing. Extending longitudinally along the opposite end of the rollers 11 are angles 13 which have one of their legs extending upwardly upon which are mounted a plurality of bearing brackets 14 within which the ends of the rollers 11 are journaled. The angle members 13 are held in spaced relation by transversely extending connecting members rigidly attached thereto to provide a suitable frame. This frame may be supported in any suitable manner as by supporting members 16 upon which the frame is adapted to rest and to which it is rigidly bolted or otherwise secured.

Certain of the rollers 11 are provided with sprockets and driven by means of a chain 17. Extending diagonally across the saw table is a beam 25 which is supported at its ends by uprights in turn supported by and secured to one of the supporting members 16 and a beam support at the opposite end, not shown. This beam 25 is rigidly supported in spaced parallel relation with respect to the rollers 11 and is disposed at a predeterminate angle and constantly fixed. A carriage 29 is slidably mounted for reciprocatory movement upon the beam 25 and has secured thereto a saw 30 adapted to produce a cut upon the wet sheet material when moved in one direction by the carriage and to be returned in inoperative position after having made its cut.

A tipple 31 is located adjacent the discharge end of the wet saw and is adapted to receive the cut lengths of material and convey them to the proper deck of the feed end of the drier.

This tipple 31 consists of a pair of longitudinally extending side members 32 held in parallelly spaced relation by cross members 33 positioned at spaced intervals longitudinally and connected by diagonal struts 34 all secured in any suitable manner to provide a rigid frame.

The feed end of the tipple 31 is pivotally connected to oscillate about an axis of the transverse shaft 35 which has its opposite end journaled in spaced bearings 36 bolted or otherwise secured to the transversely extending channels 37. Standards 38a rest upon a suitable foundation and their upper ends have secured thereto the opposite ends of the channels 37. The standards 38a are of such a height as to position the axis of the shaft 35 slightly below the axis of the rollers 11 on the wet saw, for a purpose to be later described.

The free end of the tipple 31 is adapted to be elevated and lowered as the case may be, so as to bring the free end into alignment with any one of the decks of the feed end of the drier. Rectangularly shaped hollow uprights 38 are supported upon the foundation and are positioned upon opposite sides of the tipple and at the free end thereof. These uprights are connected together by a cross member 39 which is considerably above the upper limit of the free end of the tipple 31 and supports the elevating and lowering mechanism. This consists of a transverse shaft 40 rigidly journaled in spaced bearings 41 which are bolted or otherwise secured to the upper side of the cross member 39, as shown in Figs. 2 and 3.

The opposite ends of the shaft 40 have sprocket wheels 42 keyed thereto which receive sprocket chains 43. One end of the sprocket chains 43 are connected to the ends of a transverse angle member 44, shown in Fig. 4 secured to the free end of the tipple 31 and are guided by means of idlers 45 attached to the outer side of the uprights 38 adjacent the top portion. The other ends of the chains 43 extend downwardly inside of the uprights 38 and are connected to counterweights 46 which are mounted for vertical movements therein. The counterweights 46 are provided for balancing the tipple 31 to render the same easily operable. A motor 47 is also mounted upon the cross member 39 and is connected to drive a shaft 48 which is journaled in bearings 49. The shaft 48 has keyed thereto a gear 50 of relatively large pitch diameter which is in mesh with a gear 51 of smaller pitch diameter keyed to the shaft 40. This motor 47 is of the reversing type and is controlled through a reversing mechanism 52. Therefore, as the motor 47 is operated, the free end of the tipple member is elevated or lowered, as the case may be, by reason of the chains 43 and their cooperating sprocket wheels 42.

The tipple 31 further includes an endless conveyor 53 comprising a plurality of transversely extending closely spaced slats 54 which are of sufficient length to receive the cut lengths of material. These slats 54 are connected at their opposite ends to endless sprocket chains 55 which are supported at the feed end by sprocket wheels 56 keyed or otherwise secured to the opposite ends of the shaft 35. At the discharge end or free end of the tipple 31, the chains are supported by sprocket wheels 57 keyed or otherwise secured to the opposite ends of a transverse shaft 58 journaled in bearings 59 secured to the upper outer end of the side members 32. The shaft 58 is driven by a sprocket chain 60 engaging at one end a sprocket wheel 60a, secured to the end of the shaft 58 and at the opposite end to a sprocket wheel 61 secured adjacent the end of the shaft 35, an idler wheel 62 being secured to the side frame member 32 to support the sprocket chain 60 about midway of its ends. A sprocket wheel 63 is also secured to the end of the shaft 35 and by a sprocket chain 64 connects with the driven rollers 11 of the wet saw to cause the conveyor 53 to be driven normally at the same speeds as the rollers 11 of the wet saw.

Longitudinally extending bars 65 are spaced apart parallelly and are secured to the cross members 33. The bars 65 are disposed inside or adjacent the sprocket chains 55 and provide a suitable support upon which the conveyor 53 slides. The return portion of the conveyor 53 passes beneath the angle 55 at the free end of the tipple 31 and the slats then engage and slide upon bearings 66 beneath the bars 65 secured to the cross angles 67 attached to the side frame members 32.

The drive for the tipple conveyor 53 is next through the sprocket wheel 76 to the shaft 70. An external gear 68 of small pitch diameter is secured upon a sleeve 68ª mounted upon the shaft 35 and is in constant mesh with an external gear 69 of larger pitch diameter secured to the shaft 70, which constitutes the high speed drive. An external gear 75 of small pitch diameter is secured to the shaft 70 and is in constant mesh with an external gear 74 of larger pitch diameter which drives the shaft 35 through the overrunning clutch 72, such as shown by the numeral 111 in Fig. 8. The gear 74 drives the shaft 35 through a ratchet 63ª which permits the shaft 35 to be driven at a high speed through the clutch 72 when it is energized. Gear 68 is connected to one element of the magnetic clutch 72 and the other element is keyed to the shaft 35. Thus at low speed the shaft 35 is driven through the ratchet member of the sprocket and at high speed is driven through the magnetic clutch 72 since the ratchet can overrun the speed of the gear 74.

It will be seen therefore that the tipple conveyor 53 is normally operated at the same speed as the driven rollers 11 of the wet saw by means of the sprocket chain 64, but by operation of the motor 78 may be driven at high speeds through actuation of the magnetic clutch 72. This magnetic clutch 72 is controlled by a switch 79 mounted upon the standards 16 of the wet saw and is positioned so as to be engaged by the saw carriage 29 at substantially the instant the cut or severance of the sheet material has been effected. The closing of this switch 79 causes the magnetic clutch to be energized with the result that the tipple conveyor 53 is driven through the set of speed up gears 68—69 and 74—75.

It is obvious that the speed of the tipple conveyor 53 must return to normal or board speed before the leading edge of the following sheet reaches the tipple conveyor. This is accomplished by having sufficient ratio between low and high speeds of the tipple conveyor to cause the sheet to be entirely off of the tipple conveyor before the leading edge of the following sheet reaches it. The length of time that the tipple conveyor operates at high speed is governed by a timing device 80 geared to the tipple drive shaft 35.

The timing device is more clearly illustrated in Figs. 9 and 10. The board or material as it comes along engages the saw starting switch 81 mounted upon the feed end of the tipple and slidably adjustable upon a bar 82 secured to the side frame member 32, shown in Figs. 2 and 4. This causes the saw to begin its travel across the sheet material and as soon as the saw has completed its cut it engages the switch 79 which energizes the clutch 72 and at the same time energizes the solenoid 83 on the timing device 80. This timing device is so geared that the main cam wheel 84 makes just one revolution while the tipple conveyor 53 has traveled far enough to completely discharge the board or length of sheet material which has just been cut. Upon the completion of one revolution of the main cam wheel 84 the magnetic clutch 72 is deenergized and the tipple conveyor 53 returns to its normal slow speed corresponding to the speed of the driven rollers 11 of the wet saw.

The free end of the tipple 31 has a transversely extending roller 85 rotatably supported at its ends in bearings 86 secured to the side frame members 32. One end of the roller has a sprocket wheel 87 secured to it and a sprocket chain 88 engages the sprocket wheel 87 and a sprocket wheel 89 upon the adjacent end of the shaft 58 by which the roller 85 is rotated.

The roller 85 alines with rollers 90 shown in Fig. 2, which represents the various decks of the feed end of the drier and the free end of the tipple is automatically brought into cooperating relation therewith.

The tipple 31, after discharging a cut sheet of material into a given deck of the feed end of the drier, is automatically caused to descend to the next deck below and this is brought about by energizing the tipple hoist motor 47 through operation of a mercury switch located on the timing device 80, shown in Figs. 9 and 10. A finger 91 on the timing device 80 causes the mercury switch to make momentary contact which in turn causes the contactor controlling the hoist motor to close. The contactor is held closed through a stop switch 92 located on the top of the cross member 39 supporting a hoisting apparatus. A disc 93 is geared at 94 to the hoist members and provided with pins 95 spaced at intervals corresponding to the different deck levels. Thus when the motor 47 has been started it will continue to run until the contactor is opened by a pin 95 on the disc 93 engaging the stop switch 92. When the tipple 31 has reached the bottom deck it is stopped not by the stop switch 92, but by a reversing switch 96, and the circuit is so arranged that the impulse from the switch on the timing device 80 causes the tipple contactor to close, raising the tipple to the top deck when again it is stopped by the reversing switch 96.

The feed end of the multiple deck drier comprises a suitable frame 97 made up of base members 98 which extend longitudinally in parallelly spaced relation and are supported upon the foundation in any suitable manner.

Secured to the base members 98 are uprights 99, which are connected together at their upper ends and spaced longitudinally by upper members 100, which constitute side frame elements and these are secured together by transversely extending upper and lower cross members 101 and 102 respectively.

Angle members 103 extend longitudinally along opposite sides of the frame and are spaced vertically in predetermined positions. These angle members 103 are attached at intervals to the angles 118 and the angles on opposite sides are in alignment. The angle members 103 have upstanding legs upon which are mounted bearings 104 receiving the ends of rollers 105. These rollers 105 are closely spaced and extend longitudinally comprising the various decks of the feed end of the drier and upon which the cut or severed sheets of material are adapted to be supported and conveyed to the drier proper.

The majority of the rollers 105 are driven by means of sprocket chains 106 which engage sprocket wheels 107 secured to one end of the rollers 105. At the feed end several of the rollers 105 are freely rotatable, for a purpose to be later described, and the end rollers adjacent the tipple 31 are located upon an arc so as to position the roller 85 upon the tipple in close proximity with respect to the adjacent rollers 105 upon the feed end of the drier. The return portion of the sprocket chains 106 are supported at intervals by rollers 107a mounted upon the angle members 103. The rollers 105 at the discharge end are adapted to aline with the lower rollers of the conveyors 108 within the drier proper 109, so that the cut or severed sheets of material may be conveyed between cooperating alined decks of the feed end of the drier and the drier proper.

In order that the various decks at the feed end of the drier may receive the cut or severed sheets of material at high speed from the tipple conveyor 53 each deck of rollers 110 is provided with a high speed drive through a magnetic clutch 111, the speed of the decks when operated through the clutch being the same as the high speed of the tipple conveyor 103. When the high speed drive of the rollers 110 is not operating, the rollers 110 of that particular deck of the feed end are driven through a ratchet sprocket 112 from the main drive chain 113 of the adjacent deck at drier speed, which is the same as the speed of the rollers 11 on the wet saw, thus the rollers 110 of each deck of the feed end operate at either the drier low speed or at the tipple conveyor high speed.

The clutches 111, through which the rollers 110 of the various decks are driven at the tipple conveyor high speed, are controlled by mercury switches 114 located just a few inches from the drier proper. These switches 114 are so arranged that they are normally closed and can be opened only when a sheet of material comes beneath them, thus the sheet of material being discharged from the tipple conveyor 53 is automatically driven along the rollers 110 of the various decks of the feed end at high speed until the leading edge of the sheet of material comes beneath the mercury switch 114 for that particular deck. When this switch opens the magnetic clutch 111 driving the rollers 110 of that deck at high speed is deenergized and the drive is then picked up through the ratchet sprocket 112 by the main drive chain 113 of the adjacent deck.

The construction and driving mechanism for the rollers 110 of the different decks of the feed end are shown more clearly in Fig. 8. It is preferable to positively drive the rollers 110 adjacent the drier proper of each deck and magnetic clutches 111 are also provided upon the driven rollers referred to. As all of these driven rollers operate alike and are of identical construction, a description of one will suffice.

The roller 110, of course, is hollow or tubular and extends transversely across the feed end. Plugs 115 are thrust into the opposite ends of the roller and have longitudinally extending openings therein to freely receive a shaft 116 which extends a considerable distance beyond the ends of the roller and is rotatably mounted in spaced bearings 117 welded or otherwise secured to the uprights 118, which in turn are attached to the frame. One end of the shaft 116 has a sprocket wheel 119 loosely mounted thereon and a ratchet wheel 120 secured to the end of the shaft which cooperates with a detent on the sprocket wheel to cooperatively connect the two for rotation together, but also permits the sprocket wheel to be rotated at an increased speed.

The opposite end of the shaft 116 extends through an opening in a cast frame 121 attached to the end frame and has an external gear 122 loosely mounted for independent rotation thereon. The gear 122 has a hub portion to which is secured one element of the magnetic clutch 111 while the other element is secured to the shaft 116. The end of the shaft 116 is mounted in a bearing 123 secured to the frame. The external gear 124 is mounted upon the cast frame 121 and meshes with the external gears 122 upon adjacent shafts 116. This construction follows throughout all of the driven rollers 110, and a main drive stub shaft 125 mounted upon the frame connects in any suitable manner with the motor 127, or other source of power preferably by a sprocket chain 128. This motor 127 drives the rollers 110 at high speed through the magnetic clutch 111 when energized, but upon deenergizing by operation of the switch 114, the rollers are driven at low speed by the main drive chain 113, which is connected to the sprocket wheel 119. With this arrangement the rollers 110 of each deck are independently driven at high speed or low speed, as the case may be. The housing 129 includes the magnetic clutches and driving mechanism therefor.

The operation of the apparatus with reference to the wiring diagram shown in Fig. 11 is as follows:

When the cut sheet of material reaches a point directly beneath the master switch 81 it energizes a wing lever closing the A. C. circuit which energizes the coil in contactor No. 1, which closes contacts on one line of the A. C. circuit to the wet saw stop switch. The D. C. line circuit releases the brake and energizes the wet saw clutch which starts the saw in motion thereby severing the sheet material. At the finish of the cut the saw carriage 29 engages a solenoid switch 79 releasing the clutch on the timing device 80 which starts the cam 84 rotating that energizes the high speed tipple switch 130, thus energizing the coil in contactor No. 2, closing contact on D. C. line to clutch 72 on the tipple, which then goes into high speed. The high speed tipple switch 130 also energizes the coil in the relay thus breaking contact which cuts out the master switch 81. During the time the tipple 31 is operating at high speed, the current for the wet saw is carried through the normally closed wet saw stop switch, which is opened by the saw returning to starting position. When this switch is opened, the coil in contactor No. 1 is deenergized causing contacts on both the A. C. and D. C. lines to open, releasing the clutch and applying the brake on the wet saw.

Referring back to the time the wet saw carriage 29 makes contact with the solenoid switch 79 which starts the timing device 80, the switch operating cam 84 on this device makes only one revolution during one cycle of operation, which holds the high speed clutch 72 in on the tipple 31 until the tail end of the material cut off has thus closed the end of the tipple 31.

Just before stopping, the switch cam 84 makes contact on the tipple hoist starting switch 89 momentarily which energizes the down coil in the reversing contactor causing the hoist motor 47 to start, which rotates the timing device closing the circuit through the tipple hoist load switch moving the tipple 31 to the next deck below, when a pin 95 on the timing disk 93 opens the contact on the tipple hoist load switch. This cycle of operations is continued down the stopping tipple 31 at each succeeding deck, when the tipple 31 has reached the bottom deck a pin 131 on the timing disk 93 engages a reversing switch energizing the up coil in contactor and causing the tipple 31 to be raised, when the pin 131 on the timing disk 93 moves the reversing switch to opposite pole stopping the tipple 31 at the top deck. This cycle of operations continues as long as the apparatus is in operation.

While I have described the preferred embodiment of the invention it is to be understood that I am not to be limited thereto inasmuch as changes and modifications may be resorted to without departing from the spirit of the invention as defined in the appended claims.

Having thus described my invention, I claim:

1. In an apparatus of the character described, a support for sheet material moving at a constant speed therealong, means for severing the sheet material into lengths while in motion, a conveyor for receiving the severed lengths of material, means for operating said conveyor at the sheet material speed, and means for increasing the speed of the conveyor as the length of material is severed.

2. In an apparatus of the character described, a support for sheet material moving at a constant speed therealong, means for severing the sheet material into lengths while in motion, a conveyor for receiving the severed lengths of material, means for operating said conveyor at the sheet material speed, and means controlled by said severing means for increasing the speed of said conveyor as a length of material is severed.

3. In an apparatus of the character described, a support for sheet material moving at a constant speed therealong, means for severing the sheet material into lengths while in motion, a conveyor for receiving the severed lengths of material, means for operating said conveyor at the sheet material speed, means controlled by said severing means for increasing the speed of said conveyor as a length of material is severed, and means controlled by the sheet material for returning the speed of said conveyor to sheet material speed after the length of material has been discharged from said conveyor.

4. In an apparatus of the character described, a support for sheet material moving at a constant speed therealong, means for severing the sheet material into lengths while in motion, a conveyor for receiving the severed lengths of material, means for operating said conveyor at sheet material speed, a drier through which the severed lengths of material are conveyed at drying speed, a feed end conveyor for said drier adapted to receive the severed lengths of material from said conveyor and convey them to said drier, means for increasing the speed of said conveyor as the length of material is severed, means for operating said feed end conveyor at the increased speed of said conveyor until said severed length of material is disposed thereon, and means for reducing the speed of said feed end conveyor to the drying speed of said drier before the severed length of material is discharged from said feed end conveyor.

5. In an apparatus of the character described, a support for sheet material moving at a constant speed therealong, means for severing the sheet material into lengths while in motion, a conveyor for receiving the severed lengths of material, means for operating said conveyor at sheet material speed, a drier through which the severed lengths of material are conveyed at drying speed, a feed end conveyor for said drier adapted to receive the severed lengths of material from said conveyor and convey them to said drier, means for increasing the speed of said conveyor as the length of material is severed, means for operating said feed end conveyor at the increased speed of said conveyor until said severed length of material is disposed thereon, and means controlled by the severed length of material for reducing the speed of said feed end conveyor to the drying speed of said dryer before the severed length of material is discharged from said feed end conveyor.

6. In an apparatus of the character described, a support for sheet material moving at a constant speed therealong, means for severing the sheet material into lengths while in motion, a conveyor for receiving the severed lengths of material, means for operating said conveyor at sheet material speed, a drier through which the severed lengths of material are conveyed at drying speed, a feed end conveyor for said drier adapted to receive the severed lengths of material from said conveyor and convey them to said drier, means for increasing the speed of said conveyor as the length of material is severed, means for operating said feed end conveyor at the increased speed of said conveyor until said severed length of material is disposed thereon, and means controlled by the severed length of material for reducing the speed of said feed end conveyor to the drying speed of said dryer before the severed length of material is discharged from said feed end conveyor, said means causing said feed end conveyor to operate at the conveyor increased speed when the length of material has been discharged from said feed end conveyor.

7. In an apparatus of the character described, a support for sheet material moving at a constant speed therealong, means for severing the sheet material into lengths while in motion, a conveyor for receiving the severed lengths of material, means for operating said conveyor at sheet material speed, a drier through which the severed lengths of material are conveyed at drying speed, a feed end conveyor for said drier adapted to receive the severed lengths of material from said conveyor and convey them to said drier, means controlled by said severing means for increasing the speed of said conveyor as the length of material is severed, means for operating said feed end conveyor at the increased speed of said conveyor until the severed length of material is disposed thereon, and means for reducing the speed of said feed end conveyor to the drying speed of said drier before the severed lengths of material are discharged from said feed end conveyor.

8. In an apparatus of the character described, a support for sheet material moving at a constant speed therealong, means for severing the sheet material into lengths while in motion, a conveyor for receiving the severed lengths of material, means for operating said conveyor at sheet material speed, a drier through which the severed lengths of material are conveyed at drying speed, a feed end conveyor for said drier adapted to receive the severed lengths of material from said conveyor and convey them to said drier, means controlled by said severing means for increasing the speed of said conveyor as the length of material is severed, means for operating said feed end conveyor at the increased speed of said conveyor until the severed length of material is disposed thereon, and means controlled by the severed length of material after reducing the speed of said feed end conveyor to the drying speed of said drier before the severed length of material is discharged from said feed end conveyor.

9. In an apparatus of the character described, a support for sheet material moving at a constant speed therealong, means for severing the sheet material into lengths while in motion, a plurality of superposed feed end conveyors for conveying the severed lengths of material, a tipple conveyor having one end pivotally connected adjacent said support and the opposite end free and adapted to be moved into alignment with each of said feed end conveyors, means for operating said tipple conveyor at sheet material speed during the severing operation, means for increasing the speed of said tipple conveyor after a length of material has been severed, and means for operating said feed end conveyors at the increased speed of said tipple conveyor.

10. In an apparatus of the character described, a support for sheet material moving at a constant speed therealong, means for severing the sheet material into lengths while in motion, a plurality of superposed feed end conveyors for conveying the severed lengths of material, a tipple conveyor having one end pivotally connected adjacent said support and the opposite end free and adapted to be moved into alignment with each of said feed end conveyors, means for operating said tipple conveyor at sheet material speed during the severing operation, means for increasing the speed of said tipple conveyor after a length of material has been severed, means for moving the free end of said tipple conveyor into alignment with the desired feed end conveyor during the discharge of a length of material therefrom, and means for operating said feed end conveyors at the increased speed of said tipple conveyor.

11. In an apparatus of the character described, a support for sheet material moving at a constant speed therealong, means for severing the sheet material into lengths while in motion, a plurality of superposed feed end conveyors for conveying the severed lengths of material, a tipple conveyor having one end pivotally connected adjacent said support and the opposite end free and adapted to be moved into alignment with each of said feed end conveyors, means for operating said tipple conveyor at sheet material speed during the severing operation, means for increasing the speed of said tipple conveyor after a length of material has been severed, means for moving the free end of said tipple conveyor into alignment with the desired feed end conveyor during the discharge of a length of material therefrom, means for operating said feed end conveyors at the increased speed of said tipple conveyor, and means for returning said tipple conveyor to sheet material speed after a length of material has been discharged therefrom.

12. In an apparatus of the character described, a support for sheet material moving at a constant speed therealong, means for severing the sheet material into lengths while in motion, a plurality of superposed feed end conveyors for conveying the severed lengths of material, a tipple conveyor having one end pivotally connected adjacent said support and the opposite end free and adapted to be moved into alignment with each of said feed end conveyors, means for operating said tipple conveyor at sheet material speed during the severing operation, means controlled by said severing means for increasing the speed of said tipple conveyor, means for moving the free end of said tipple conveyor into alignment with the proper feed end conveyor, means for returning said tipple conveyor to sheet material speed after a length of material has been discharged therefrom, and means for operating said feed end conveyors at the increased speed of said tipple conveyor.

13. In an apparatus of the character described, a support for sheet material moving at a constant speed therealong, means for severing the sheet material into lengths while in motion, a feed end having multiple deck conveyors for conveying the severed length of material therealong, a tipple conveyor having one end pivotally connected adjacent said support and the opposite end free and adapted to be moved into alignment with each of said feed end conveyors, a drier having multiple deck conveyors in alignment with the respective conveyors of said feed end and through which the severed lengths of material are conveyed at drying speed, means for operating said tipple conveyor at sheet material speed during the severing operation, means for increasing the speed of said tipple conveyor after the length of material has been severed, means for operating said feed end conveyor at the increased speed of said tipple conveyor during the discharge of a severed length of material therefrom, and means for reducing the speed of said feed end conveyors to the drying speed of said drier conveyors before the severed length of material is discharged.

14. In an apparatus of the character described, a support for sheet material moving at a constant speed therealong, means for severing the sheet material into lengths while in motion, a feed end having multiple deck conveyors for conveying the severed length of material therealong, a tipple conveyor having one end pivotally connected adjacent said support and the opposite end free and adapted to be moved into alignment with each of said feed end conveyors, a drier having multiple deck conveyors in alignment with the respective conveyors of said feed end and through which the severed lengths of material are conveyed at drying speed, means for operating said tipple conveyor at sheet material speed during the severing operation, means controlled by said severing means for increasing the speed of said tipple conveyor as a length of material is severed, means for operating said feed end conveyor at the increased speed of said tipple conveyor during the discharge of a severed length of material therefrom, and means for reducing the speed of said feed end conveyors to the drying speed of said drier conveyors before the severed length of material is discharged.

15. In an apparatus of the character described, a support for sheet material moving at a constant speed therealong, means for severing the sheet material into lengths while in motion, a feed end having multiple deck conveyors for conveying the severed length of material therealong, a tipple conveyor having one end pivotally connected adjacent said support and the opposite end free and adapted to be moved into alignment with each of said feed end conveyors, a drier having multiple deck conveyors in alignment with the respective conveyors of said feed end and through which the severed lengths of material are conveyed at drying speed, means for operating said tipple conveyor at sheet material speed during the severing operation, means for increasing the speed of said tipple conveyor after the length of material has been severed, means for operating said feed end conveyor at the increased speed of said tipple conveyor during the discharge of a severed length of material therefrom, and means controlled by the severed length of material for reducing the speed of said feed end conveyors to the drying speed of said drier conveyors before the severed length of material is discharged.

16. In an apparatus of the character described, a support for sheet material moving at a constant speed therealong, means for severing the sheet material into lengths while in motion, a feed end having multiple deck conveyors for conveying the severed length of material therealong, a tipple conveyor having one end pivotally connected adjacent said support and the opposite end free and adapted to be moved into alignment with each of said feed end conveyors, a drier having multiple deck conveyors in alignment with the respective conveyors of said feed end and through which the severed lengths of material are conveyed at drying speed, means for operating said tipple conveyor at sheet material speed during the severing operation, means for increasing the speed of said tipple conveyor after the length of material has been severed, means for operating said feed end conveyor at the increased speed of said tipple conveyor during the discharge of a severed length of material therefrom, and means controlled by the severed length of material for reducing the speed of said feed end conveyors to the drying speed of said drier conveyors before the severed length of material is discharged, said means causing said feed end conveyors' speed to be returned to the tipple conveyor increased speed after the severed length of material has passed beyond said control means.

17. In an apparatus of the character described, a support for sheet material moving at a constant speed therealong, means for severing the sheet material into lengths while in motion, a feed end having multiple deck conveyors for conveying the severed length of material therealong, a tipple conveyor having one end pivotally connected adjacent said support and the opposite end free and adapted to be moved into alignment with each of said feed end conveyors, a drier having multiple deck conveyors in alignment with the respective conveyors of said feed end and through which the severed lengths of material are conveyed at drying speed, means for operating said tipple conveyor at sheet material speed during the severing operation, means controlled by said severing means for increasing the speed of said tipple conveyor as a length of material is severed, means for operating said feed end conveyor at the increased speed of said tipple conveyor during the discharge of a severed length of material therefrom, and means controlled by the severed length of material for reducing the speed of said feed end conveyors to the drying speed of said drier conveyors before the severed length of material is discharged.

18. In an apparatus of the character described, a support for sheet material moving at a constant speed therealong, means for severing the sheet material into lengths while in motion, a feed end having multiple deck conveyors for conveying the severed length of material therealong, a tipple conveyor having one end pivotally connected adjacent said support and the opposite end free and adapted to be moved into alignment with each of said feed end conveyors, a drier having multiple deck conveyors in alignment with the respective conveyors of said feed end and through which the severed lengths of material are conveyed at drying speed, means for operating said tipple conveyor at sheet material speed during the severing operation, means for increasing the speed of said tipple conveyor after the length of material has been severed, means for operating said feed end conveyor at the increased speed of said tipple conveyor during the discharge of a severed length of material therefrom, means for reducing the speed of said feed end conveyors to the drying speed of said drier conveyors before the severed length of material is discharged, and means for automatically moving the free end of said tipple conveyor into alignment with successive conveyors of the feed end upon the discharge of a severed length of material.

19. In an apparatus of the character described, a support for sheet material moving at a constant speed therealong, means for severing the sheet material into lengths while in motion, a feed end having multiple deck conveyors for conveying the severed length of material therealong, a tipple conveyor having one end pivotally connected adjacent said support and the opposite end free and adapted to be moved into alignment with each of said feed end conveyors, a drier having multiple deck conveyors in alignment with the respective conveyors of said feed end and through which the severed lengths of material are conveyed at drying speed, means for operating said tipple conveyor at sheet material speed during the severing operation, means for increasing the speed of said tipple conveyor after the length of material has been severed, means for operating said feed end conveyor at the increased speed of said tipple conveyor during the discharge of a severed length of material therefrom, means for reducing the speed of said feed end conveyors to the drying speed of said drier conveyors before the severed length of material is discharged, and means for automatically moving the free end of said tipple conveyor into alignment with each succeeding lower conveyor of said feed end.

20. In an apparatus of the character described, a support for sheet material moving at a constant speed therealong, means for severing the sheet material into lengths while in motion, a feed end having multiple deck conveyors for conveying the severed length of material therealong, a tipple conveyor having one end pivotally connected adjacent said support and the opposite end free and adapted to be moved into alignment with each of said feed end conveyors, a drier having multiple deck conveyors in alignment with the respective conveyors of said feed end and through which the severed lengths of material are conveyed at drying speed, means for operating said tipple conveyor at sheet material speed during the severing operation, means for increasing the speed of said tipple conveyor after the length of material has been severed, means for operating said feed end conveyor at the increased speed of said tipple conveyor during the discharge of a severed length of material therefrom, means for reducing the speed of said feed end conveyors to the drying speed of said drier conveyors before the severed length of material is discharged, means for automatically moving the free end of said tipple conveyor into alignment with each succeeding lower conveyor of said feed end, and means for returning the free end of said tipple conveyor to its uppermost position after it has been moved into alignment with the lowermost conveyor of said feed end.

RICHARD C. MOORE.